US005624880A

United States Patent [19]

Steffier

[11] Patent Number: 5,624,880
[45] Date of Patent: Apr. 29, 1997

[54] HIGH DENSITY HIGH SURFACE AREA ADSORBENTS

[75] Inventor: Lawrence W. Steffier, Cherry Hill, N.J.

[73] Assignee: Rohm and Haas Company, Philadelphia, Pa.

[21] Appl. No.: 405,427

[22] Filed: Mar. 15, 1995

Related U.S. Application Data

[63] Continuation of Ser. No. 98,976, Jul. 28, 1993, abandoned.

[51] Int. Cl.$^6$ .............................. B01J 20/26; B01J 20/30; B01D 15/00
[52] U.S. Cl. .............................. 502/402; 502/150; 526/296; 210/660; 210/661; 210/690; 210/691; 210/692
[58] Field of Search .............................. 502/402, 150; 526/296; 210/660, 661, 690, 691, 692

[56] References Cited

U.S. PATENT DOCUMENTS

| | | | |
|---|---|---|---|
| 3,072,588 | 1/1963 | Vitkuske et al. | 526/293 |
| 4,526,884 | 7/1985 | Tsou et al. | 502/154 |
| 4,732,887 | 3/1988 | Obanawa et al. | 502/402 |
| 5,089,045 | 2/1992 | Bush et al. | 435/252.1 |
| 5,298,314 | 3/1994 | Even et al. | 428/245 |
| 5,300,599 | 4/1994 | Hsu et al. | 502/154 |

FOREIGN PATENT DOCUMENTS

| | | | |
|---|---|---|---|
| 2372845 | 6/1978 | France | C08F 12/16 |
| 1570398 | 9/1969 | Germany | C08F 19/00 |
| 59-89311 | 5/1984 | Japan . | |
| 767216 | 12/1976 | South Africa . | |

OTHER PUBLICATIONS

Biotechnol. Prog., vol 6, 1990, pp. 370–375, FP Gailliot et al., "Fluidized Bed Adsorpion for Whole Broth Extraction".
Fluidized Bed Adsorption for Whole Broth Extraction, FP Gailliot et al., Biotechnol. Prog. 1990, pp. 370–375.
Porous Texture and Bromine Distribution in Porous Styrene--Bromostyrene-Divinylbenzene Terpolymers, M. Bacquet et al., Eur. Polym. J, vol 24, No. 611, pp. 533–537, 1988.

*Primary Examiner*—Anthony R. McFarlane
*Assistant Examiner*—Nadine G. Preisch
*Attorney, Agent, or Firm*—Thomas J. Howell

[57] ABSTRACT

A particulate adsorbent is the crosslinked polymerization product of a brominated vinyl aromatic monomer and a crosslinking monomer and exhibits a density greater than or equal to about 1.01 grams per cubic centimeter and a surface area greater than or equal to about 10 square meters per gram.

18 Claims, No Drawings

HIGH DENSITY HIGH SURFACE AREA ADSORBENTS

This application is a continuation, of application Ser. No. 98,976 filed Jul. 28, 1993, now abandoned.

TECHNICAL FIELD

The present invention relates to high density high surface area adsorbents.

BACKGROUND

Fluidized bed adsorption has been recognized in the pharmaceutical industry as an attractive alternative to whole broth solvent extraction for isolating extracellular products from fermentation broths. Whole broth solvent extraction includes direct extraction with an immiscible solvent, followed by subsequent phase separation using centrifugal separators. There are several disadvantages associated with whole broth solvent extraction, i.e., the method requires costly centrifugal equipment and uses large volumes of solvent with associated requirements for large volume tanks and solvent recovery processing.

In a fluidized bed adsorption process a product or by-product is extracted directly from the fermentation broth onto an adsorbent in an upflow fluidized bed and can be subsequently eluted from the adsorbent particles. Fluidized bed adsorption avoids the problems of high equipment costs and high solvent use that are associated with the full broth extraction methods.

An adsorbent for use in fluidized bed adsorption of products from fermentation broths must have a higher terminal settling velocity than the broth solids, wherein terminal settling velocity means the upflow velocity at which particles will not remain in the column, so that the adsorbent particles remain in the column. The adsorbent particles must also exhibit a sufficiently high specific adsorptive capacity, i.e., grams of products adsorbed per gram adsorbent, for the product to be separated under the dynamic conditions in the fluidized bed to allow cost effective processing. Furthermore, since the products of the fermentation are to be used in pharmaceutical applications, it is highly desirable that the particles do not release any impurities during processing that might contaminate the product.

A brominated vinylaromatic adsorbent made by bromination of, e.g., a styrene-divinylbenzene copolymer, is disclosed in Japanese Patent No. 59089311. The adsorbent provides a specific surface area of at least 200 square meters per gram and has a bromine content of 3 to 20 weight percent. A brominated styrene-divinylbenzene copolymer has been used to separate immunomycin from a fermentation broth, see Gaillot, F. T., Gleason, C., Wilson, J. J. and Zwark, J., "Fluidized Bed Adsorption for Whole Broth Extraction", *Biotechol. Prog.* 6, 370–375 (1990).

SUMMARY OF THE INVENTION

A particulate adsorbent is disclosed. The adsorbent is the crosslinked polymerization product of:
- an amount of a brominated vinyl aromatic monomer effective to provide an absorbant that exhibits a density greater than or equal to about 1.01 grams per cubic centimeter, and
- a crosslinking monomer, said crosslinking monomer including two or more ethylenically unsaturated sites per molecule;

and exhibits a surface area greater than or equal to about 10 square meters per gram.

In a preferred embodiment, the brominated aromatic monomer is selected from the group consisting of bromostyrene, dibromostyrene, tribromostyrene, tribromophenyl maleimide, (pentabromophenyl)methyl 2-propenoate and mixtures thereof.

In a preferred embodiment, the crosslinking monomer is selected from the group consisiting of divinylbenzene, divinylethylbenzene, trivinylbenzene and mixtures thereof.

DETAILED DESCRIPTION OF THE INVENTION

The adsorbent particles of the present invention are the crosslinked random copolymerization product of two or more unsaturated comonomers and includes first comonomeric units, each derived from a brominated aromatic monomer, and second comonomeric units, each derived from a polyethylenically unsaturated crosslinking monomer.

Compounds suitable as the brominated aromatic monomer are those which include at least one aromatic moiety per molecule having one or more bromine substituent atoms on the aromatic moiety and include at least one unsaturated site per molecule, e.g., bromostyrene, dibromostyrene, tribromostyrene, tribromophenyl maleimide, (pentabromophenyl)methyl 2-propenoate and mixtures thereof.

Preferred monomers contain bromine-substituted aromatic moieties each comprising an aromatic ring of six carbon atoms and each of the rings is independently substituted with from one to five bromine atoms per ring. In a preferred embodiment, the brominated aromatic monomer includes one ethylenically unsaturated site per molecule and two or more bromine atoms per molecule e.g., dibromostyrene, tribromostyrene, tribromophenyl maleimide, (pentabromophenyl)methyl 2-propenoate and mixtures thereof.

In a highly preferred embodiment, the brominated aromatic monomer comprises tribromostyrene. Adsorbent particles of the present invention made using tribromostyrene as the brominated monomer have been found to unexpectedly exhibit both a higher density and a higher surface area than particles of the present invention having the same bromine content made under the same conditions using dibromostyrene as the brominated monomer.

Compounds suitable as the crosslinking monomer include polyethylenically unsaturated, i.e., having two or more ethylenically unsaturated sites per molecule, aromatic hydrocarbons, e.g., divinylbenzene, divinylethylbenzene, trivinylbenzene, divinylanthracene, divinylnaphthalene and mixtures thereof and polyethylenically unsaturated aliphatic compounds, e.g., trimethylolpropane trimethacrylate, poly (ethylene glycol) dimethacrylates, allyl methacrylate.

The copolymer may further include third comonomeric units derived from a non-brominated monoethylenically unsaturated, i.e., having a single ethylenically unsaturated site per molecule, monomer, e.g., ethylvinylbenzene, styrene, alkyl acrylates, alkyl methacrylates and mixtures thereof.

The particles of the present invention exhibit an average surface area greater than or equal to about 10 square meters per gram ($m^2/g$) and have a bromine content effective to provide an adsorbent having a density greater than or equal to about 1.01 grams per cubic centimeter ($g/cm^3$). Densities are expressed herein as pycnometric densities.

In a preferred embodiment, the adsorbent particles exhibit a density from about 1.05 $g/cm^3$ to about 1.6 $g/cm^3$. In a more highly preferred embodiment, the adsorbent particles exhibit a density between about 1.10 g/cm$^3$ and about 1.55 g/cm$^3$. Most preferably, the adsorbent particles exhibit a density between about 1.12 g/cm$^3$ and about 1.5 g/cm$^3$.

The adsorbent particles include an amount of bromine substituent atoms effective to provide a desired density. In a preferred embodiment, the adsorbent particles include greater than or equal to about 10 weight percent (wt %) bromine. More preferably, the adsorbent particles include from about 20 wt % to about 55 wt % bromine.

The particles of the present invention are made by polymerizing commercially available brominated monomers. The bromine content of the adsorbent particles of the present invention is solely in the form of bromine atoms that are each bonded to a respective aromatic carbon atom of the copolymer and the particles appear clear to white in color.

Post-bromination of polymeric particles requires handling and use of a hazardous material, i.e., elemental bromine. Post-brominated adsorbent particles are randomly brominated, i.e., the bromine content is present in the form of bromine atoms bonded to nonaromatic carbon atoms, e.g., carbon atoms of the polymer backbone, as well as in the form of bromine atoms bonded to aromatic carbon atoms and appear brown in color. The bromine atoms that are bonded to nonaromatic carbon atoms of post-brominated copolymers are less thermodynamically stable than those bonded to aromatic carbon atoms and post-brominated polymeric adsorbent particles require additional processing, e.g., caustic washes, to remove the relatively unstable bromine atoms.

In a preferred embodiment, from about 10 wt % to about 90 wt % of the comonomeric units of the copolymer are derived from the brominated aromatic monomer and from about 10 wt % to about 90 wt % of the comonomeric units of the copolymer are derived from the aromatic crosslinking monomer and up to about 30 wt % comonomeric units derived from the non-brominated monoethylenically unsaturated monomer.

In another preferred embodiment, from about 20 wt % to about 80 wt % of the comonomeric units of the copolymer are derived from the brominated aromatic monomer and from about 20 wt % to about 80 wt % of the comonomeric units of the copolymer are derived from the aromatic crosslinking monomer and up to about 20 wt % comonomeric units derived from a non-brominated monoethylenically unsaturated monomer.

In another preferred embodiment, from about 30 wt % to about 65 wt % of the comonomeric units of the copolymer are derived from the brominated aromatic monomer and from about 30 wt % to about 65 wt % of the comonomeric units of the copolymer are derived from the aromatic crosslinking monomer and from about 5 wt % to about 15 wt % comonomeric units derived from a non-brominated monoethylenically unsaturated monomer.

In a preferred embodiment, the adsorbent particles exhibit a surface area from about 40 m$^2$/g to about 900 m$^2$/g. As used herein the terminology "particle surface area" refers to the surface area of adsorbent particles as measured by the method of Brunauer, Emmett and Teller, i.e., the "BET" surface area of the particles. In a more highly preferred embodiment, the adsorbent particles exhibit a surface area from about 100 m$^2$/g to about 700 m$^2$/g. Most preferably, the adsorbent particles exhibit a surface area from about 200 m$^2$/g to about 700 m$^2$/g.

In a preferred embodiment, the particles exhibit a mean particle size from about 0.1 microns (µm) to about 5000 µm.

In a more highly preferred embodiment, the particles exhibit a mean particle size from about 35 µm to about 2000 µm. Most preferably, the particles exhibit a mean particle size from about 300 µm to about 800 µm.

The porous adsorbent particles of the present invention are made by conventional polymerization techniques, e.g., precipitation polymerization, suspension polymerization, emulsion polymerization. In a preferred embodiment, the adsorbent is made by free radical initiated aqueous suspension polymerization of a mixture of the brominated aromatic monomer and the aromatic crosslinking monomer.

In a preferred embodiment of the method, an inert porogenic compound, e.g., o-xylene, toluene, methyl isobutyl carbinol, is included in the organic phase during the polymerization and subsequently removed from the polymerized particles to provide macropores in the particles. As used herein the term "macropores" refers to pores having an average diameter greater than about 20 Angstroms.

The high density adsorbent of the present invention is useful for treating a liquid by contacting, e.g., in a countercurrent fluidized adsorption bed, the liquid, e.g., an aqueous liquid, to separate compounds, e.g., an organic compound, dissolved in the liquid, from the liquid.

The adsorbent of the present invention is particularly useful for treating a fermentation broth by contacting the broth with the adsorbent to separate a fermentation product or by-product from the broth.

The adsorbent of the present invention is also useful in packed adsorption column applications wherein the high density of the particles provides a high settling velocity and a uniformly packed adsorption bed within the column.

The particles of the present invention can be coated, post-functionalized, e.g., by conventional sulfonation or chloromethylation techniques, or coated and post functionalized to provide high density organo-functional particles useful as, e.g., ion exchange resins.

EXAMPLE 1

A high density high surface area adsorbent of the present invention was made by suspension polymerization.

Boric acid (1.13 grams), and a dispersant (0.86 grams Culminal CMMC-2000) and 0.97 g 50% sodium hydroxide were dissolved in deionized water (570 grams) in a two liter round-bottomed flask.

An organic phase was prepared. Monomers, 80% divinyl benzene ((DVB), 57 grams) and dibromo styrene ((DBS), 115 grams) were charged into a mixing vessel. The 80% divinyl benzene (DOW Chemical) was a commercially available mixture of about 80 wt % divinyl benzene and about 20 wt % ethyl vinyl benzene. A porogenic solvent, o-xylene (266 grams) and an initiator (97% benzoyl peroxide, 3.42 grams) were charged to the vessel with agitation. The mixture was agitated for 30 minutes with a nitrogen sparge.

The organic phase was added to 572.96 g of the aqueous phase with agitation under a nitrogen sweep. The mixture was heated to 79° C. and held at that temperature for 12 hours, resulting in the formation of spherical copolymeric particles. The product mixture was cooled to 35° C. and washed batchwise with deionized water to remove the dispersant. The porogen was removed by heating the batch to 85° C. and then supplying further heating by sweeping the head space with dry steam. The stripping was continued for 2 hours after removal of the porogen and then the batch was cooled to 35° C. and washed with 3 times with 1 bed volume of deionized water per wash. The process yielded white spherical particles having the properties set forth in Table 2 below.

EXAMPLE 2

Particles were made by the method described above in Example 1, except that: the organic phase consisted of 57.4 g of 80% DVB, 151 g tribromostyrene (TBS), 343 g o-xylene and 1.14 g t-butyl peroctoate (t-BPO);the organic phase was added to 572.97 g aqueous phase; and the polymerization reaction was conducted at 72° C. for 12 hours.

EXAMPLES 3 to 7

An aqueous phase stock solution was made by mixing 19.821 kg water, 0.03 kg dispersant (CMMC-2000), 0.079 kg boric acid and 0.070 kg of a 50% aqueous solution of sodium hydroxide.

Organic phases were made as set forth below. The amounts of reactants used for each example are set forth below in Table 1. Solid tribromostyrene was weighed into a polytetrafluoroethylene bottle. O-xylene was weighed out and transferred into the bottle with the tribromostyrene. High purity divinyl benzene (nominally 80% DVB, DOW Chemical ) was weighed out and added to the organic mixture with magnetic stirring and agitated to dissolve the tribromostyrene (~15 minutes).

The aqueous solution was transferred to a round bottomed flask equipped with a double-bladed stirrer and sparged with nitrogen for thirty minutes. The flask was then continuously swept with nitrogen. A polymerization initiator (t-BPO, 80% purity) was added to the organic phase and the organic phase was then added to the stirring aqueous phase in the flask. The mixture was stirred for 5 minutes without heating. The temperature of the stirred mixture was the ramped from ambient (~25° C.) to 72° C. at a rate of 1° C./minute and then held at 72°C. for 12 hours to produce polymeric particles.

After polymerization the mother liquor was removed and replaced with deionized water and the polymeric particles were stripped of organic solvent by heating the mixture to 100° C. and holding the mixture at that temperature until no organic distillate was observed for 2 hours. The particles were then separated from the liquid phase in a Buchner funnel.

TABLE 1

|         | Example 3 | Example 4 | Example 5 | Example 6 | Example 7 |
| --- | --- | --- | --- | --- | --- |
| 80% DVB | 86.14  | 100.37 | 114.6 | 123.79 | 215.79 |
| TBS     | 113.86 | 99.63  | 85.4  | 68.38  | 215.21 |
| o-xylene| 316.3  | 335    | 353   | 358.11 | 720.25 |
| t-BPO   | 1.65   | 1.82   | 1.99  | 2.01   | 3.91  |

EXAMPLE 8

Polymeric particles were made by the method described above in Examples 3–7, except that dibromostyrene was substituted for tribromostyrene as the brominated monomer. The organic phase included 57.0 g 80% DVB, 115.0 g DBS, 266.0 g o-xylene and 1.14 g t-BPO.

EXAMPLE 9

Polymeric particles were made by the method of Examples 3 to 7, except that no o-xylene was used and a mixture of bromobenzene (BB) and pentabromobenzyl acrylate ((PBBA), 98% purity, Broomchemie, Terneuzen) was substituted for the tribromostyrene monomer. The organic phase included 102.44 g 80% DVB, 570 g BB, 97.54 g PBBA and 1.82 g t-BPO.

EXAMPLE 10

Polymeric particles were made by the method of Examples 3 to 7, except that tribromophenyl maleimide ((TBBM), 99.6% purity, Bromine Compounds, Ltd., Beer-Sheva, Israel) was substituted for the tribromobenzene monomer. The organic phase included 97.38 g 80% DVB., 102.65 g TBBM, 381.2 g o-xylene and 1.67 g t-BPO.

EXAMPLE 11

The particle size of the particles was measured using a HIAC Particle Size Analyzer equipped witIt an E-2500 sensor.

The BET surface area of the particles was measured by nitrogen porosimetry.

The true wet density of the particles was measured by water displacement using a pycnometer.

The capacity of the adsorbent composition of Examples 1–9 to adsorb Cephalosporin-C was measured under dynamic conditions and compared to that of a prior art adsorbent.

Adsorbent particles were pretreated by soaking the particles in methanol for 2 hours. The adsorbent particles were then charged to a column to form an particulate bed and 10 bed volumes of methanol were passed through the bed at a flow rate of 2 bed volumes per hour. The bed was then rinsed with 10 bed volumes of purified water at a flow rate of 10 bed volumes per hour.

A 10,450 parts per million (ppm) solution of an antibiotic compound (Cephalosporin-C) was prepared by dissolving 11.0000 grams of 95% pure Cephalosporin-C (Sigma-Aldrich) in 1 liter of an aqueous 3.5% NaCl solution that had been adjusted to a pH of 2.5 with sulfuric acid to provide a solution. 150 milliliters (ml) of the Cephalosporin-C solution was charged to a 250 ml beaker and stirred at 300 rpm with an overhead stirrer. Pretreated adsorbent (6.4 ml) was then added to the stirred solution. A 1 ml aliquot of the stirred solution was removed 2 minutes after addition of the adsorbent. The aliquot was diluted with 20 ml of an aqueous 3.5% NaCl solution that had been adjusted to a pH of 2.5 with sulfuric acid. The diluted sample was analyzed spectrophotometrically by comparing the absorbance of the sample at 259 nm with a calibration curve derived using samples of known Cephalosporin-C content. The amount of Cephalosporin-C adsorbed by the adsorbent was then calculated by subtracting the Cephalosporin-C content of the sample aliquot from the initial Cephalosporin-C content of the solution.

Aliqouts of the stirred solution were removed at 5 minutes after addition of the adsorbent and at 5 minute intervals thereafter and analyzed as set forth above.

The particle size (microns), surface area ($m^2/g$), pore volume (ml/ml), true wet density (g/ml) and the dynamic Cephalosporin uptake capacity as milligrams Cephalosporin-C adsorbed per cubic centimeter adsorbent ($mg/cm^3$) in 30 minutes measured for the compositions of Examples 1 to 9 are set forth below in Table 2.

TABLE 2

|   | Bromine Content (wt %) | Mean Particle Size (microns) | BET Surface Area (m²/g) | Density (g/ml) | Uptake Capacity (mg/cm³) |
| --- | --- | --- | --- | --- | --- |
| 1 | 37.8 | 270 | 350 | — | 75 |
| 2 | 46.4 | 382 | 283 | 1.46 | — |
| 3 | 40 | 242 | 353 | 1.26 | 79 |
| 4 | 35 | 349 | 451 | 1.21 | 79 |
| 5 | 30 | 558 | 394 | 1.2 | 77 |
| 6 | 25 | 484 | 557 | 1.16 | 80 |
| 7 | 35 | 398 | 427 | 1.2 | 78 |
| 8 | 35 | 250 | 311 | 1.13 | — |
| 9 | 35 | 259 | 298 | 1.24 | 91 |
| 10 | 30 | — | — | 1.20 | — |

EXAMPLE C1

An 80 wt % DVB/20 wt % EVB copolymer was made substantially according the method set forth in Example 1, except that the DBS monomer used in Example 1 was replaced with 80% DVB, i.e., 80% DVB was the sole monomer used to make the particles of Example C1. The DVB/EVB particles (10 grams) were air-dried, then rewetted with methanol and then rinsed with deionized water. Deionized water was added to the rinsed particles to form a slurry of the particles in 60 grams water. The slurry was mixed in a 200 ml round-bottomed flask and 7.5 grams bromine was added dropwise from an addition funnel at a rate effective to keep the temperature of the slurry below 40° C. without added cooling. The slurry was then stirred for one hour at ambient temperature, heated to 70° C. within a time period of 30 minutes and then held at 70° C. for three hours. The slurry was cooled, the brown particles produced were separated from the liquid phase and rinsed with deionized water.

EXAMPLE 12

The stability of the adsorbent of the present invention at high pH was investigated and compared to that of the post-brominated particles of Example C1.

A sample of the adsorbent of Example 2 was filtered in a glass fritted Buchner funnel and rinsed several times with distilled water. A portion of the wet filter cake (20 g) was added to a 350 ml of a 5% aqueous sodium hydroxide solution and stirred at 40° C. for two weeks. Samples of the adsorbent were periodically withdrawn from the solution. Each of the samples were rinsed with water and then methanol, dried and analyzed to determine bromine content.

The stability test was repeated for the adsorbents of Examples 10 and C1.

Results of the stability testing are given in Table 3 as bromine content (%) at several treatment times (hours).

TABLE 3

| Example No. | Treatment Time (hr) | Bromine Content (wt %) |
| --- | --- | --- |
| 10 | 0 | 26.68 |
| 10 | 2 | 24.53 |
| 10 | 24 | 26.88 |
| 10 | 120 | 27.79 |
| 10 | 336 | 28.12 |
| 2 | 0 | 50.25 |
| 2 | 2 | 49.28 |
| 2 | 21.5 | 50.22 |
| 2 | 165 | 49.66 |

TABLE 3-continued

| Example No. | Treatment Time (hr) | Bromine Content (wt %) |
| --- | --- | --- |
| 2 | 337.5 | 49.3 |
| C1 | 0 | 32.47 |
| C1 | 2 | 25.83 |
| C1 | 6 | 25.04 |
| C1 | 24 | 19.65 |
| C1 | 96 | 20.82 |

The particulate adsorbent of the present invention exhibits high density, high surface area and high dynamic uptake capacity and is clear to white in appearance. The bromine content of the particulate adsorbent of the present invention is stable under hydrolysis conditions and the particulate adsorbent is made using commercially available brominated monomers, i.e., without the need to handle elemental bromine.

I claim:

1. A particulate adsorbent, comprising a crosslinked polymerization product comprising monomeric units derived from:
   about 20 weight percent to about 80 weight percent of a brominated vinyl aromatic monomer, said brominated vinyl aromatic monomer containing three or more bromine atoms,
   about 20 weight percent to about 80 weight percent of a crosslinking monomer, said crosslinking monomer including two or more ethylenically unsaturated sites per molecule, and
   up to about 30 weight percent of a non-brominated monoethylenically unsaturated monomer;
   wherein said adsorbent exhibits a surface area from about 100 square meters per gram to about 700 square meters per gram, exhibits a density from about 1.10 grams per cubic centimeter to about 1.55 grams per cubic centimeter and is formed by suspension polymerization; and wherein weight percent is expressed as percent of the crosslinked polymerization product.

2. The adsorbent of claim 1, wherein the brominated vinyl aromatic monomers comprise bromine-substituted aromatic moieties each comprising an aromatic ring of six carbon atoms and each of the rings is independently substituted with from three to five bromine atoms per ring.

3. The adsorbent of claim 1, wherein the brominated aromatic monomer is selected from the group consisting of tribromostyrene, tribromophenyl maleimide, (pentabromophenyl)methyl 2-propenoate and mixtures thereof.

4. The adsorbent of claim 1, wherein the crosslinking monomer is selected from the group consisting of divinylbenzene, divinylethylbenzene, trivinylbenzene and mixtures thereof.

5. The adsorbent of claim 1, wherein the crosslinking monomer comprises trivinylbenzene.

6. The adsorbent of claim 1, wherein the monomeric units comprise from about 30 weight percent to about 65 weight percent monomeric units derived from the brominated aromatic monomer, from about 30 weight percent to about 65 weight percent monomeric units derived from the crosslinking monomer and from about 5 weight percent to about 15 weight percent monomeric units derived from the non-brominated monoethylenically unsaturated monomer.

7. The adsorbent of claim 1, wherein the adsorbent includes greater than or equal to about 10 weight percent bromine atoms.

8. The adsorbent of claim 7, wherein the adsorbent comprises from about 20 wt % to about 55 wt % bromine atoms.

9. The adsorbent of claim 1, wherein the adsorbent particles have a specific surface area from about 200 square meters per gram to about 700 square meters per gram.

10. The adsorbent of claim 1, wherein the adsorbent particles have a density from about 1.12 grams per cubic centimeter to about 1.5 grams per cubic centimeter.

11. The adsorbent of claim 1, wherein the adsorbent particles have a mean particle size from about 0.1 microns to about 5000 microns.

12. The adsorbent of claim 1, wherein the adsorbent particles are clear to white in appearance.

13. A method for treating an aqueous liquid to remove an organic solute dissolved in the liquid, comprising;

contacting the liquid with the particles of claim 1.

14. The method of claim 13, wherein the liquid comprises a fermentation broth, the solute comprises a fermentation product or by-product and wherein the liquid is contacted with the particles in a fluidized adsorption bed.

15. The method of claim 13, wherein the liquid is contacted with the particles in an adsorption column.

16. A particulate adsorbent, comprising a crosslinked polymerization product comprising monomeric units derived from:

about 20 weight percent to about 80 weight percent brominated aromatic monomer selected from the group consisting of tribromostyrene, tribromophenyl maleimide, (pentabromophenyl)methyl 2-propenoate and mixtures thereof;

about 20 weight percent to about 80 weight percent crosslinking monomer, said crosslinking monomer including two or more ethylenically unsaturated sites per molecule; and up to about 30 weight percent non-brominated monoethylenically unsaturated monomer;

wherein said adsorbent exhibits a surface area from about 100 square meters per gram to about 700 square meters per gram and exhibits a density from about 1.10 grams per cubic centimeter to about 1.55 grams per cubic centimeter, wherein the adsorbent is clear to white in appearance and is in the form of spherical particles having a mean particle size from about 35 microns to about 2000 microns formed by suspension polymerization in the presence of an inert porogenic compound, and wherein weight percent is expressed as percent of the crosslinked polymerization product.

17. The adsorbent of claim 16, wherein the monomeric units comprise from about 30 weight percent to about 65 weight percent monomeric units derived from the brominated aromatic monomer and from about 30 weight percent to about 65 weight percent monomeric units derived from the crosslinking monomer.

18. The adsorbent of claim 1, wherein the adsorbent is in the form of spherical particles having a mean particle size from about 35 microns to about 2000 microns.

* * * * *